(12) United States Patent
Settle

(10) Patent No.: US 7,236,738 B2
(45) Date of Patent: Jun. 26, 2007

(54) MULTICAST CONTROL SYSTEMS AND METHODS FOR DYNAMIC, ADAPTIVE TIME, BANDWIDTH,FREQUENCY, AND SATELLITE ALLOCATIONS

(75) Inventor: Timothy F. Settle, Cumming, GA (US)

(73) Assignee: Pathfire, Inc., Roswell, GA (US)

( * ) Notice: Subject to any disclaimer, the term of this patent is extended or adjusted under 35 U.S.C. 154(b) by 378 days.

(21) Appl. No.: 10/632,483

(22) Filed: Aug. 1, 2003

(65) Prior Publication Data

US 2005/0037706 A1    Feb. 17, 2005

(51) Int. Cl.
H04H 1/00        (2006.01)
(52) U.S. Cl. .................................. 455/3.01; 455/3.05
(58) Field of Classification Search .............. 455/13.1, 455/13.2, 464, 450, 451, 452.1, 3.01, 3.05; 395/200.33; 370/326; 375/200.33
See application file for complete search history.

(56) References Cited

U.S. PATENT DOCUMENTS

| 4,009,344 | A |   | 2/1977  | Flemming |
| 4,599,720 | A |   | 7/1986  | Kunzinger |
| 5,553,083 | A |   | 9/1996  | Miller |
| 6,002,852 | A | * | 12/1999 | Birdwell et al. ............ 709/203 |
| 6,104,911 | A | * | 8/2000  | Diekelman ................. 455/13.1 |
| 6,487,183 | B1 | * | 11/2002 | Lo et al. ..................... 370/326 |
| 2003/0083948 | A1 |   | 5/2003 | Obiaya |
| 2003/0084067 | A1 |   | 5/2003 | Obiaya |

FOREIGN PATENT DOCUMENTS

| WO | WO 00/44606 | 8/2000 |
| WO | WO 00/67449 | 11/2000 |

OTHER PUBLICATIONS

Marshall, James W, et al., "Mixed Channel Resource Allocation Analysis," Proceedings of the Annual Military Communications Conference (MILCOM), US, New York, IEEE, vol. Conf. 12, Oct. 11, 1993, pp. 983-987, XP000410899.
Harris, Nicole, "N2 Broadband Bets on Video-on-Demand Gear," The Wall Street Journal, Nov. 1, 2001, p. B8.

* cited by examiner

*Primary Examiner*—Edward F. Urban
*Assistant Examiner*—Tu X. Nguyen
(74) *Attorney, Agent, or Firm*—Kilpatrick Stockton LLP; Geoffrey K. Gavin

(57) ABSTRACT

Methods and systems to efficiently share multiple satellites and associated transponders or links among a network of uplinking earth stations are disclosed. An embodiment of this invention uses a terrestrial communications link, such as the Internet, to control access to the transponder or satellite links. Communications over this link may employ a TCP/IP protocol to connect the requesting uplinking earth stations with a centralized controller. This control system creates more efficient use of satellite resources and reduces the overall amount of time needed for transmitting data through the satellite. By reducing the overall amount of time needed for transmitting data, the control system may reduce the cost of using the satellite transponder capacity.

20 Claims, 7 Drawing Sheets

MULTICAST CONTROL SYSTEMS AND METHODS FOR DYNAMIC, ADAPTIVE TIME, BANDWIDTH, FREQUENCY, AND SATELLITE ALLOCATIONS

FIELD OF THE INVENTION

The present invention generally relates to satellite data networks, and more particularly, to systems and methods for managing two-way satellite data network systems through a centralized central server utilizing a terrestrial link. Methods and systems are also disclosed for dynamic bandwidth allocation using a hybrid rate allocation, frequency allocation, satellite allocation, and time-slicing mechanism with distributed, hierarchical control.

BACKGROUND OF THE INVENTION

Data communication via satellite has grown with leaps and bounds recently. That growth has reduced transmission costs and increased usage, but at the cost of bandwidth congestion. In part, the congestion is due to an operation environment that utilizes static channel assignments with scheduling based on manual time reservation mechanisms.

For example, in the past, distributing television, cable, and other video/sound files to local stations around the country has been done by manually scheduling the feeds. Typically, a satellite transmitter has a fixed allocation of bandwidth and, if a user needs to transmit ten minutes worth of data, the user manually places a phone call to a provider and indicates that he or she would like ten minutes of transponder time at a specified time (e.g., 4:00 p.m.). This negotiation for transponder time is time consuming and inefficient and may result in the user being forced to purchase an hour's worth of transponder time when all that is needed is ten minutes. Consequently, once the user finishes transmitting his data, the transponder sits dormant for the remaining fifty minutes, which results in wasted capacity. Currently, no providers have a system that promotes the efficient use of transponder time through the reuse and sharing of previously dedicated facilities.

Some alternative satellite providers are looking at reliable multicast transmission as a key technology that may be used to minimize network traffic. Coordination is a major problem with multicast file distribution over a satellite. In other words, the problem is how can many content providers (e.g., channels, news organizations, etc.) distribute their content without overwhelming the network bandwidth. This is especially a problem where bandwidth allocation is handled through a manual system.

A second problem in multicasting files over a satellite communications network is that you cannot determine exactly when your file is sent. No one can know with certainty when a particular transmission will end. In the past, people have dealt with this problem by statistically evaluating the data transmission information to determine a statistical end point over time. That is, by looking at a number of transmissions after the fact, one can figure out how many actually went through on time. Usually, that percentage is very high, approximately 90%. It can be made even higher, but the trade-off typically is a less efficient use of satellite transponder time. In other words, if you want to be certain that your file will be sent over the satellite when you schedule it, you need, overall, to schedule less traffic than the system can handle. In essence, this is very like what a doctor does in scheduling patient appointments—if the doctor wants to make sure he or she sees the maximum number of patients, the doctor will schedule many appointments for the day. But, as the day progresses, the delay between when the doctor sees the patients and the patients' appointment times lengthens. The doctor can remedy this by reducing the number of appointments, but then the doctor runs the risk of having some down time during which no patient is scheduled.

In any event, if bandwidth is allocated based on these statistical averages, inevitably some jobs will not be completed within the allocated transmission time. Skilled persons in this art say this means that your file completion times are "non-deterministic." Non-deterministic file transmission causes scheduling difficulties in projecting future start times for other data transmission. This can be a critical problem. For instance, consider a breaking news story, such as a presidential news conference, that a network wants to be certain is sent out across the country to various local affiliates. It is critical that the network knows that at the set time the news story will be transmitted. You would normally think that to guarantee files are sent on time, and thus solve the scheduling problems described above, one could just increase the rate the data is sent over the satellite. But this brings up another problem with multicast, which is that data throughput varies. For example, suppose five out of six cable headends where the cable equipment operators maintain their equipment have state of the art, well maintained equipment that can receive data at 100 Mbps (one Mbps is equivalent to one million bits of data per second). One of the six head ends can only receive data at 10 Mbps. In this situation, if all six need to receive the file within a certain designated time, increasing transmission bandwidth does not guarantee a transmission stop time because there is a "weak link in the chain," namely the 10 Mbps head end.

Conventional systems do not provide efficient or optimum resource allocation when multiple local demands are placed on a control system. International Application Serial No. PCT/US00/10394, published as International Publication No. WO 00/67449, filed Apr. 18, 2000, which is hereby incorporated by reference in its entirety, addressed some of the above-identified problems by introducing dynamic rate allocation, dynamic time slicing and logical framing, and distributed hierarchical control. However, there remains room for improvement. More specifically, optimizing available multiple satellite resources across a diverse satellite distribution network is not provided for by International Application Serial No. PCT/US00/10394. Additionally, applications such as providing access to multiple satellite resources using multiple uplink sites and creating a content distribution network utilizing content from multiple content providers are not disclosed in International Application Serial No. PCT/US00/10394.

Many broadcast communication satellites used for transmitting multimedia information operate in an orbital plane known as a geo-synchronous or geo-stationary orbit. Such satellites operate within the equatorial plane of the earth and their transmission is designed for maximum signal strength within a beam or footprint that covers a predetermined portion of the earth's surface. An example is a satellite beam designed to cover the continental United States, such a beam being generally referred to as a CONUS beam. However, because satellite communication requires line-of-sight transmission between the receiver antenna/dish on the earth's surface and the orbital position of the satellite, a receiver can only receive one transmission from one satellite at a time. This limitation may be overcome by using multiple antennas and receivers with each antenna aligned with a different satellite.

With multicast file distribution, there exists centralized control for the multicast distribution session, even when there is more than one physical outbound distribution channel (e.g., multiple satellite uplink sites). In multicast file distribution over a satellite network where the desired receivers are dispersed over multiple satellite beams, there exists a multicast scheduling problem. The scheduling problem arises from a lack of coordinated control between the centralized multicast distribution site and the multiple satellites that can collectively transmit to the desired pool of receivers. There are many instances where a user may wish to send a multicast transmission to geographically diverse receive sites that cannot be covered by any one satellite transponder. In such cases, it is desirable to maintain efficient use of required satellite resources.

To address the identified problems, the present invention provides a distributed-hierarchical scheduling control system that monitors the network and adapts dynamic rate allocation, frequency allocation, satellite allocation, time slicing, and logical framing to optimize system resources.

SUMMARY OF THE INVENTION

This invention addresses these issues by providing dynamic rate allocation, dynamic time slicing and logical framing, dynamic frequency allocation, and dynamic space allocation, and a distributed, hierarchical control system. According to the methods and systems of this invention, adaptive network programming optimizes resource allocation. Systems and methods of the present invention provide for the effective sharing of two or more satellite transponders between multiple satellite uplink stations using out-of-band terrestrial signaling/control. Using an out of band communication link such as a separate communications network like the Internet, VSAT, or frame relay with an efficient protocol, transponder sharing among satellite uplink stations can be controlled and automated. The automation process minimizes idle time, which means additional satellite capacity for the users.

Certain exemplary preferred embodiments of systems and methods of the present invention employ space division multiple access (SDMA) methodologies for multicast file distribution over multiple satellites, including meshed access to uplink satellite resources and meshed reception at clients with adaptive central control and management. SDMA makes it possible to control several satellite resources for successful file distribution. With SDMA, statistics relating to different satellite resources play a role in adapting the entire network not only for bandwidth allocations based on individual satellite link capabilities, but also the number of clients based on file distribution lists compared against reachable clients.

Certain exemplary embodiments of this invention enable a distributed set of uplink station facilities to efficiently share an outbound satellite link without requiring the expense of two-way RF or satellite transmission. Requests and resulting channel assignments are specified in terms of scheduled transmission times within a variable time horizon. Accordingly, the system can offer either a scheduled batch transmission service mode or an interleaved, time division multiple access mode. The master arbitration server provides a master clocking reference for synchronization. This clocking reference may be generated from a highly accurate local reference (e.g., an atomic clock) or may be slaved to an external source, such as the GPS network.

Certain embodiments of the invention effectively share a limited amount of satellite resources with multiple remote sites and satellite transmitters. Using an out of band control supports use of a satellite transponder for either analog video or high-speed data transfers. Two way data communication is also possible using a satellite for the outgoing high-speed data transfer and the control path as the return data path, and "path-switching" between two or more transmission sites in a half-duplex communications fashion.

Certain exemplary embodiments of the present invention overcome the problems of the current environment of satellite transmissions that use static channel and satellite assignments, with scheduling based on manual time reservation mechanisms. In one embodiment of this invention, a system of master and sub-controllers overlay, adaptively, dynamically or both, satellite, channel (or frequency), rate, and time slice allocations upon a common set of network transport resources. These network transfer resources may be in the form of wireline, wireless, satellite, or other communications network capacity. A master arbitration server receives access requests from multiple local (or remote) controllers, each of which desires to schedule a file transmission over a communications resource. The access requests include information that the master arbitration server uses to assess the priority of the file transmission. A schedule for satellite and channel use is set based on this information. The master arbitration server returns to each local arbitration server information concerning the satellite, channel, and time slice to which each will have access.

Local arbitration servers, in turn, have authority over their use of the time slice assigned for their use. The local arbitration servers may subdivide their time slices based on their local needs and the priorities of the files they need transferred, resulting in a file transmission scheme that is similar to a time division multiplexed scheme. In addition, however, the local arbitration servers also may set the file transmission rate (e.g., bandwidth) to be assigned a particular transmission.

Another advantage to using local arbitration servers is the distributed intelligence achieved in the system allows for dynamic reaction to events. This is best explained by example. Past transmission system schemes have static retransmission schema. Thus, the system might try to send a file seven times before giving up. The problem with this approach is that the static schemes add to network rigidity. The system can become unstable because it receives problem jobs that require retries and then either delay other jobs, causing a ripple effect on the schedule, or simply do not get sent. Meanwhile, new jobs are entering the system for transmission. By contrast, the local arbitration servers allow the system dynamically to decide whether to keep trying to send a particular file or job or whether to move on to the next file. Also, the local arbitration servers can decide to send part of the file now and hold the rest for transmission in another time slice, resulting in the local arbitration server efficiently using some of the assigned capacity and completing at least a portion of the file transmission. A system having a master arbitration server and a number of local arbitration servers promotes efficient reuse and sharing of previously dedicated network transport resources.

Certain exemplary preferred embodiments of this invention may be adapted for using an Internet protocol ("IP") multicast-based service for distributing various files. This service achieves large-scale distribution of the files, such as media files comprising shows, commercials, news events, sport events, etc., via an IP multicast within an adaptive reliability layer. The master and local arbitration servers balance the use of network transport resources with the respective priorities and service commitments associated with each file or set of files that need to be distributed over the system.

Certain exemplary embodiments may be implemented by coupling a master arbitration server to a communications network that allows the master arbitration server to communicate with various local arbitration servers, each of which are associated with a portion of the network transport facilities. For instance, a local arbitration server may be associated with a satellite transmitter and the appropriate hardware necessary to package the data for satellite transmission. The master arbitration server may comprise a scheduling server that sets the basic distribution times for a file or set of files. The master arbitration server may assign a satellite, a channel, and a time slice to a particular file. The master arbitration server forwards that assignment data to the local arbitration server. The local arbitration server, depending upon the other jobs it receives and/or network traffic data, will itself adaptively assign each of the multiple jobs a particular rate and, if appropriate, may further divide the time slices to which each job is assigned. The local arbitration server thereby dynamically and adaptively overlays rate allocation upon the initial space, channel and time slice assigned by the master arbitration server.

Certain exemplary embodiments of the present invention include determining the rate at which files may be broadcast. Bottlenecks in multicasting occur on communication links, as understood by those skilled in the art. Additionally, however, bottlenecks occur because of the servers and clients receiving the files. For instance, each time a client computer opens a new application, that application detracts from the client computer resources otherwise available for accepting files, which, in turn, decreases the rate that the client computer can receive file transfers. By gathering feedback on the data rates handled by portions of the communications network, including both the communications link and the clients receiving the files, multicast file transfer performance may be further improved. Such feedback may be provided to a master arbitration server for analysis and dynamic action.

Accordingly, using certain exemplary embodiments of methods and systems of this invention achieves at least one, more, or combinations of the following advantages:

Can maximize the number of files transmitted to the maximum number of sites successfully at the highest rate possible.

Utilizes four degrees of freedom (rate, time, frequency, and space) to manage priority and non-priority data transfers.

Provides best-effort and guaranteed service levels.

Utilizes distributed control and hierarchical bandwidth/space management agents. (hierarchical management includes space management as this invention makes it possible to control several satellite resources for successful file distribution)

Utilizes network management statistics to adapt bandwidth/space allocation.

Can emulate rate-proportional sharing (TCP/IP) for IP multicast.

Can be deployed in conjunction with standard RF media access control mechanisms.

DETAILED DESCRIPTION OF THE INVENTION

Figure 1:
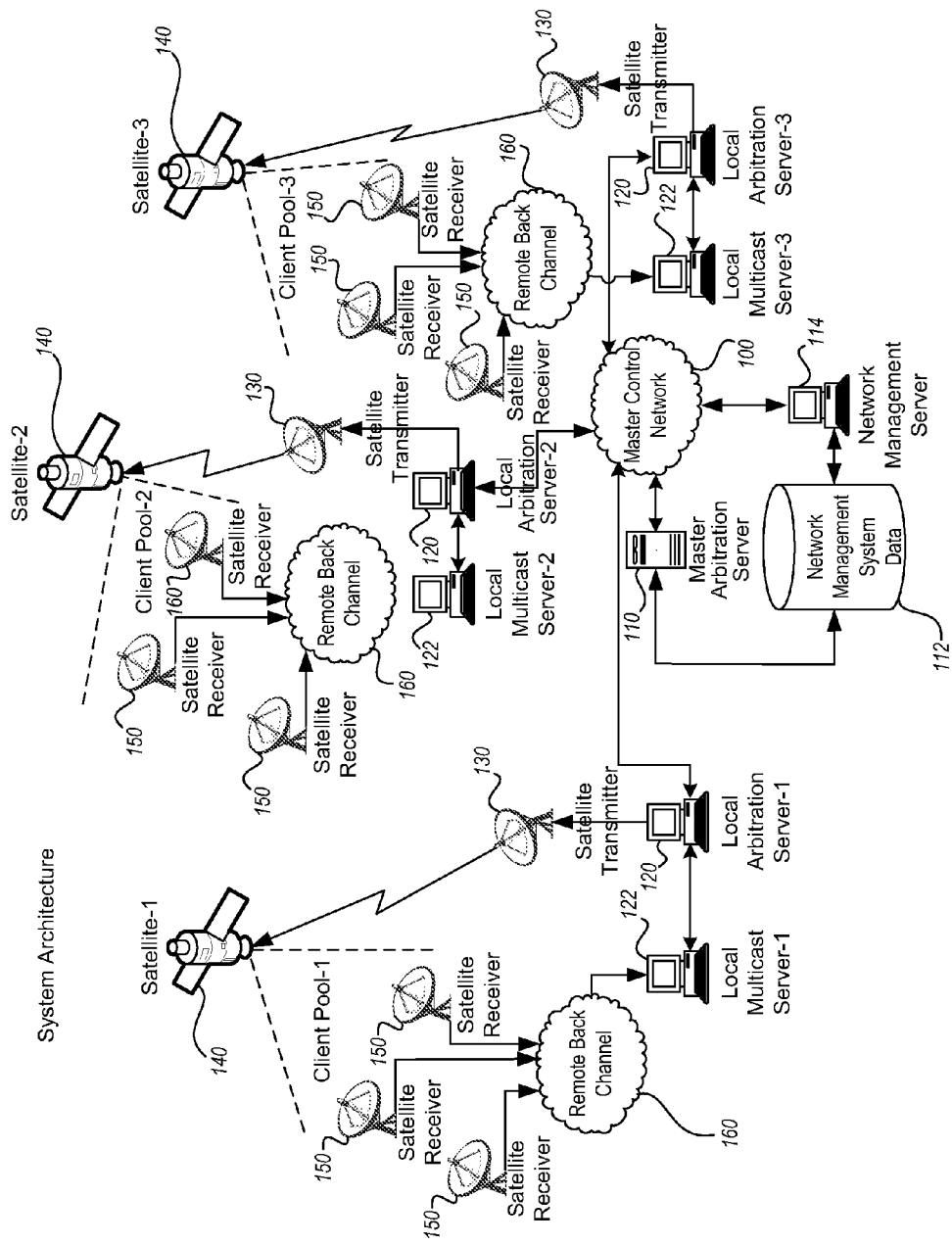
FIG. 1 is a diagram showing an exemplary topology for one embodiment of the system of the present invention.

Before describing the drawings and certain exemplary, preferred embodiments in more detail, several terms are described below in an effort to clarify the terminology used herein. Additional and fuller understanding of these terms will be clear to persons skilled in this art upon reading this entire document.

100baseT: Ethernet network 100 megabit per second interconnection.

Client: A client is a program, which interacts with a Server program that may be on a remote machine.

CRC: Cyclic Redundancy Check—a type of checksum used to validate data, generally after storage or transport.

DNS: Domain Name System

DVB: Digital Video Broadcast

EDI: Electronic Data Interchange

FDM: Frequency Division Multiplexing

IP: Internet Protocol

Local Arbitration Server: This is a computer, such as a workstation, which runs software to allow it to determine which jobs to put into the queue on what schedule and on what bandwidth. The local arbitration server has a view of the demand for the resources locally.

Master Arbitration Server: This is a computer, such as a workstation, running network control software that manages overall resources and has a scheduling function. The master arbitration server allocates satellites, channels, an aggregate rate, and/or an aggregate time slice. The master arbitration server "arbitrates" between the requests for satellite resources made by various content providers, the network capabilities and the local arbitration servers.

Multicast: A process of sending a transmission to a selected subset of recipients (as opposed to point to point, or broadcast).

MPEG2: Second generation digital video compression and transmission standard formalized by the Moving Pictures Experts Group.

NT: Short for Windows NT Server, an operating system from Microsoft Corporation.

Out of Band: Not transmitted with the signal in question. May be on a different frequency, or by another means altogether (e.g., Internet vs. satellite).

PIDs: Program Identifiers as defined by MPEG.

Priority Information: This refers to information that the arbitration servers may use in order to assign a particular priority to a job. The information can be as simple as a pre-assigned priority code and delivery time to more detailed information, such as the credit worthiness of the sender, the volume of business provided by the sender, the value of the information, whether the sender will pay a surcharge for a particular service guarantee, etc. With such information in hand, skilled persons will recognize that the servers or associated programs may assign a priority. An additional factor to note concerning priority information is that while a request may contain some priority information, other priority information may be stored at the server and used in assigning the ultimate priority.

QPSK: Quadrature Phase Shift Keying

Scheduler: A program that guarantees that requested content has been successfully transmitted as scheduled.

SDMA: Space Division Multiple Access. References herein to allocating satellites are allocations to space, and thus the phrase space division multiple access.

Server: A program that provides specific services to clients (e.g. database or protocol management). It is frequently important enough (or busy enough) to run alone on a dedicated machine.

Signaling Channel: A separate channel used to control activity on other channels, or other processes.

TDM: Time Division Multiplexing

Uplink station: This refers to an aggregation of equipment for transmitting (or even receiving). Each station may contain data communications equipment for communicating with a network or computer to receive files, upconversion equipment, an RF amplifier, and the actual transmit dish.

WWW: World Wide Web, an Internet hypermedia application.

Figure 2:
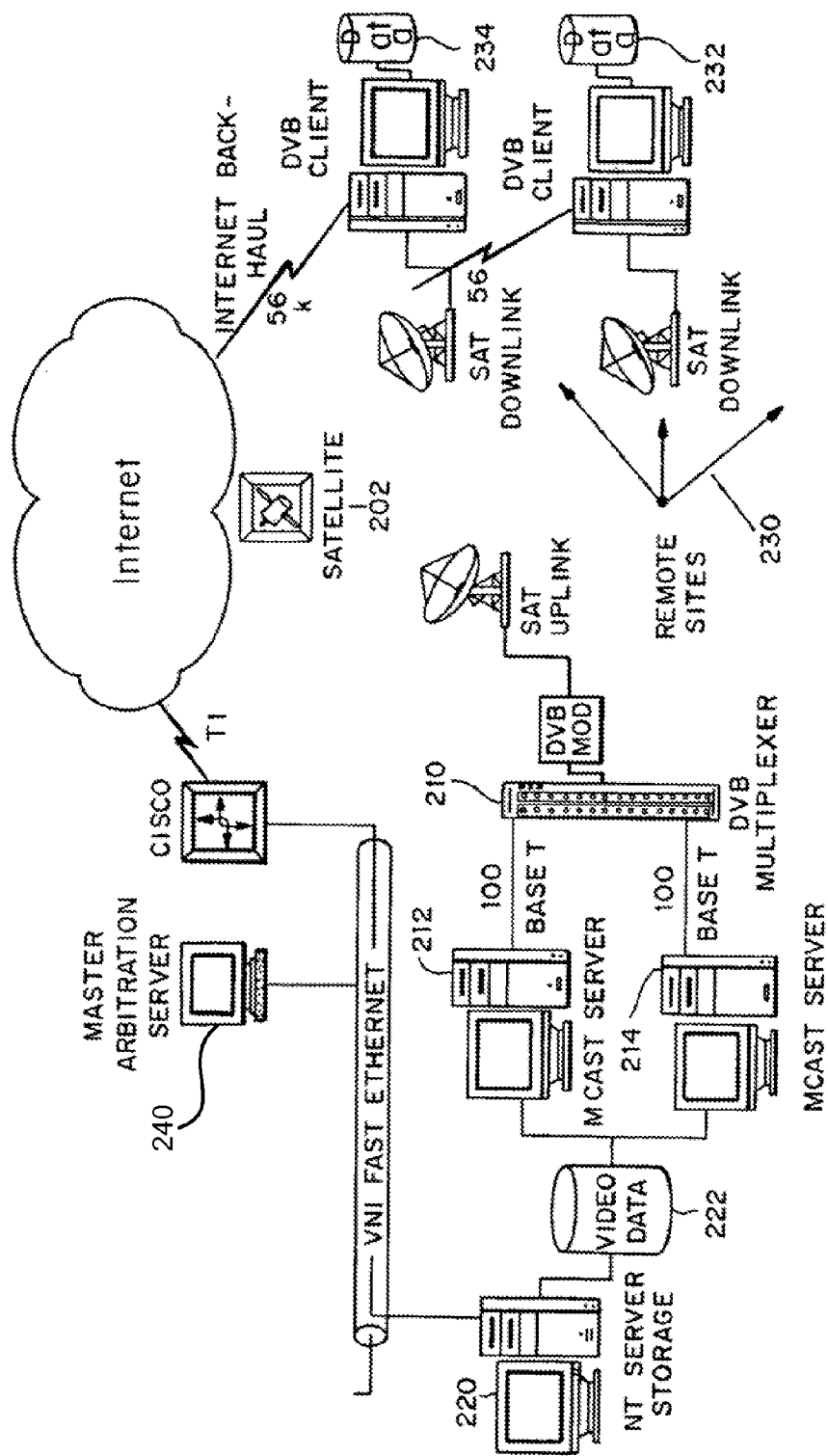
FIG. 2 provides additional detail of system components and resources that can be used to implement the embodiment shown in FIG. 1.
Figure 3:
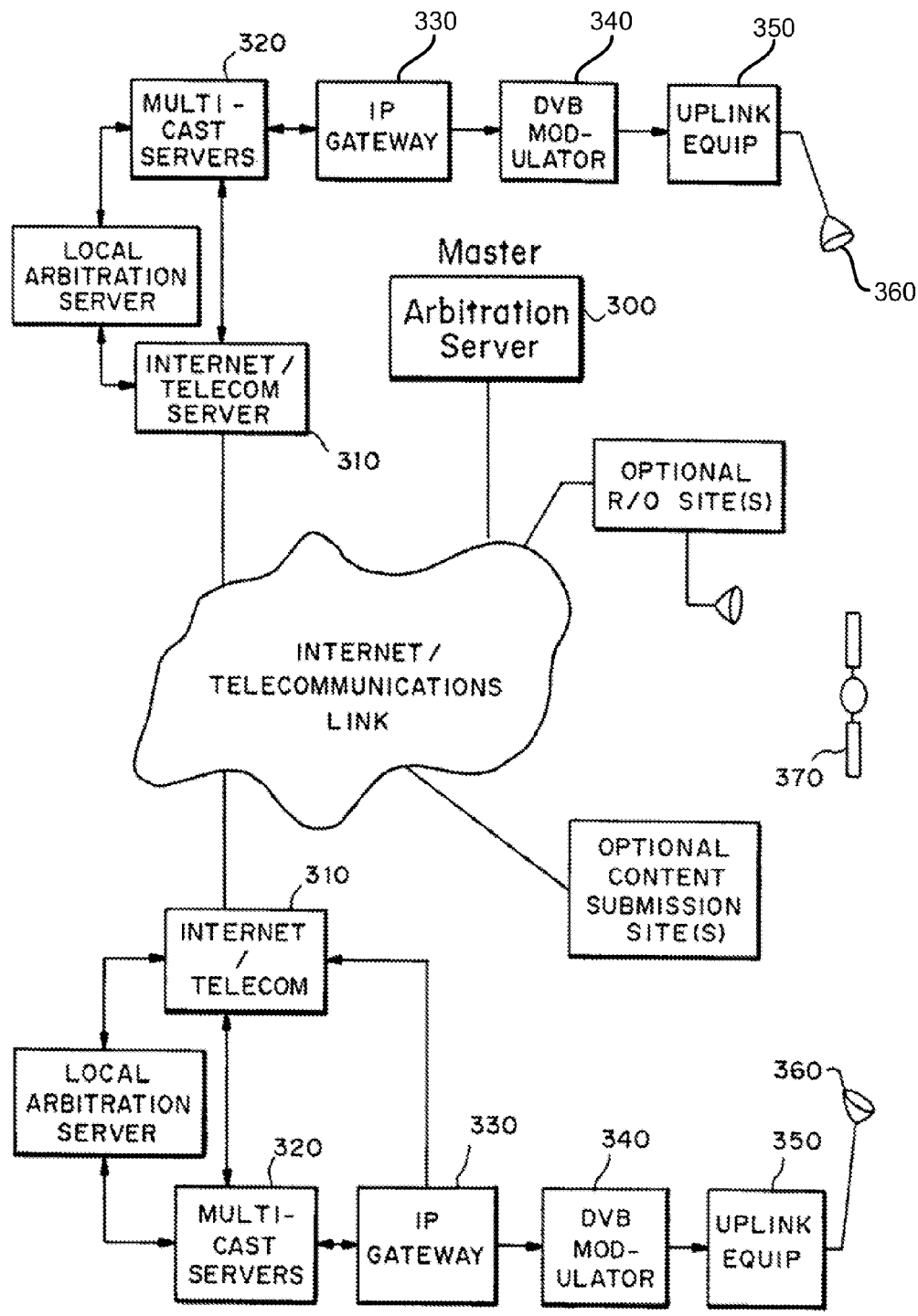
FIG. 3 is a schematic diagram showing the interrelationships between the local arbitration servers and the master arbitration server of the present invention.

Overview (FIGS. 1–3)

This application describes improved systems, methods, protocols, and inventions to those disclosed in U.S. Provisional Application Ser. No. 60/129,988, filed Apr. 18, 1999, and International Application Serial No. PCT/US00/10394, published as International Publication No. WO 00/67449, filed Apr. 18, 2000, each of which is hereby incorporated by reference in its entirety. Certain exemplary embodiments according to this invention include dynamic rate allocation, dynamic time slicing and logical framing, dynamic frequency allocation, dynamic satellite allocation, and distributed hierarchical control. These exemplary embodiments are merely preferred embodiments of the invention; other embodiments of the invention may be implemented by persons skilled in the art. According to an exemplary embodiment of this invention, control of one multicast session over multiple satellites is provided to maximize multicast file distribution to a spatially diverse client pool referenced to their respective satellite alignment. Spatial diversity is characterized based on a receiver or client aligned with the orbital coordinates of a satellite (i.e., azimuth and elevation coordinates).

In an exemplary embodiment, a portion of the architecture of a system of this invention includes a master arbitration server, a plurality of distributed satellite uplink sites, a plurality of distributed local arbitration servers, and a plurality of satellites, as shown in FIG. 1. A master control network 100 allows a master arbitration server 110 to control various local arbitration servers 120. Each of local arbitration servers 120 is coupled to a local multicast server 122 and to a satellite transmitter 130. Each of local multicast servers 122 stores the content that is to be distributed via the network transport facilities such as the satellite network shown in FIG. 1. In concept, FIG. 1 shows a distributed, hierarchical system in which each satellite transmitter 130 has a set of clients comprising various satellite receivers 150. Satellite transmitters 130 in turn have local multicast servers 122 that act as a scheduler and local arbitration servers 120. The functionality of multicast servers 122 and local arbitration servers 120 may be implemented on one or multiple workstations or computer platforms.

Satellite transmitters 130 communicate via satellites 140 to various satellite receivers 150 that couple via remote back channels 160 to local arbitration servers 120 and master arbitration sever 110. As shown in FIG. 1, each satellite 140 serves a geographically diverse client pool of satellite receivers 150. With a spatially diverse satellite network, as shown in FIG. 1, content is distributed through a cohesively managed distribution network using SDMA techniques. Master arbitration server 110 couples to a database 112 supplied with network management data via a network management subsystem 114. Master control network 100 allows for out-of-band interconnection between various components of the system shown in FIG. 1. For instance, master control network 100 can be a communications network configured for TCP/IP, VSAT, frame relay, ATM, or Internet communications. Similarly, remote back channel 160 can be a back channel for receiving downlink information (e.g., confirmation of file receipt/transmission status) that can be a communications network such as a packet switched network or the internet.

FIG. 2 shows one implementation of the architecture shown in FIG. 1 for a single satellite and client pool. FIG. 2 shows an implementation of a control system of the present invention in which multiple satellite uplink stations 210 share unidirectional satellite 202 bandwidth by scheduling access for uplinking earth stations 210 via a local arbitration server 220 placed in a centralized location for storing video data 222. Each of uplinking earth stations 210 has access to local arbitration server 220 through the Internet (or some other suitable communications link). Local arbitration server 220 may control the allocation of bandwidth within one transponder, the allocation of multiple transponders on one satellite, and/or the allocation of bandwidth across multiple satellites 202.

Each uplink station 210 comprises satellite transmission and formatting equipment known to persons skilled in the art. Associated with uplink stations 210 are one or more local multicast servers 212 and 214, each of which provides the access control at earth uplink station 210 and local storage for data 222 to be transmitted over satellite 202. Multicast servers 212 and 214 have access to the Internet (or other suitable communications pathway) for communications with local arbitration server 220 via a local signaling server. In addition, uplinking earth station 210 may have satellite modem equipment connected to the local multicast server and satellite earth station transmission equipment. Local arbitration server 220 schedules access for any individual, local multicast servers 212 and 214, placed at any uplinking earth station 210. An illustrative embodiment of a control system architecture in accordance with the present invention is illustrated in FIG. 2 wherein two of a possible plurality of uplinks are shown.

Each of local multicast servers 212 and 214 may store packetized data in files. Each file can be selected individually for transmission or grouped together for transmission in a batch mode. Once a file has been selected for transmission, a selected protocol is followed for transmission.

For instance, local multicast server 212 may request a transmission window from local arbitration server 220. Master arbitration server 240 prioritizes and allocates communications across satellite 202 resources available. Access to satellite 202 resources can be granted on a "first-come first-serve basis" or any number of priority schemes to provide a particular guaranteed quality of service (QoS). Local arbitration server 220 may also incorporate a bandwidth management system, which makes sure that the available satellite resource is never over-subscribed. Accordingly the master arbitration server 240 provides high-level access control to satellite 202, whereas local arbitration server 220 provides lower-level access control to satellite 202. In one protocol according to this invention, local arbitration server 220 may provide the requesting local multicast server 212 a message detailing the transmission window for the particular file transmission, after receiving an initial allocation grant from the master arbitration server 240. Local arbitration server 220 authorizes the actual transmission over satellite 202 by sending an authorization message for the designated satellite resource to the local multicast server that is scheduled to transmit. No local multicast server may begin transmitting data through the satellite resource unless it has received the authorizing message, and not until the authorized start time. The control system uses authorizing messages as the methodology to ensure that only one uplinking earth station is accessing satellite 202 resources at any given moment.

After it has received the authorizing message from local arbitration server 220, multicast server 212 manages the transmission of the data through the satellite transponder. At the exact authorized time, the carrier for uplink station 210 is enabled and the output of multicast server 212 feeds to the modulation equipment of uplinking earth station 210. After it is modulated, it is then upconverted and amplified for transmission through satellite 202 transponder. Any number of applications can be used to manage the flow of data over the satellite. Protocols known to skilled persons in this field can be employed to selectively retransmit data that was corrupted before being received by the earth stations.

The multicast server uses the Internet (or another suitable communications pathway) for communications with the receive stations or "clients." After it schedules a transmission with local arbitration server 220, it contacts client sites 230 through an open multicast group address. The open group is contacted and the members of the smaller transmission group are instructed to begin "listening" to a satellite resource for the transmission. Once switched to the new closed group address each client in the newly formed "closed group" is instructed to register with the multicast server 212 or 214 that initiated the session. The server's IP address for this response is passed during the registration process. This response occurs over the Internet (or another suitable communications path for return data) and that client (or receive site 232 or 234) can now begin to receive the multicast data being distributed in that particular closed session.

While a local multicast server 212 or 214 is authorized to transmit, local arbitration server 220 may send it an update message allocating increased or reduced bandwidth and/or changing its frequency assignment. Such a resource change by the local arbitration server is within the initial resource limits dictated by the master arbitration server. The local arbitration server may even ask the local multicast server to pause its transmission. The local multicast server then takes appropriate steps to cause its group to make this change, and returns an acknowledgment message to local arbitration server 220. This allows local arbitration server 220 to handle higher priority QoS requests, and to prevent the fragmentation of bandwidth within a transponder. If multicast server 212 finishes earlier than its allotted time, it may notify local arbitration server 220 of its intent to relinquish the time remaining. This allows local arbitration server 220 to reallocate that time. It must leave its carrier on until it receives an updated authorization message from local arbitration server 220 telling it the exact time that it must turn off its carrier. It may request additional time in the same manner, but the transaction granting additional time must be completed before the end time of the original authorization granted by the master arbitration server. Multicast server 212 should shut down its carrier at the exact time specified in the current authorization message.

FIG. 3 presents a summary of the architecture of one embodiment of a system for implementing this invention for a single satellite and client pool. A master arbitration server 300, which arbitrates amongst the various requests for satellite uplink time and local arbitration servers 302, couples via a communications network 310 to various multicast servers 320 located remotely from master arbitration server 300. Through an IP gateway 330, multicast servers 320 push content into a standard DVB modulator 340 for uplinking over equipment 350 on the schedule and at the rate dictated, as described below, by the master and local arbitration servers. The uplink station has various components including modulator 340, uplink equipment 350, and dish 360 for transmitting files to satellite 370.

Figure 4:
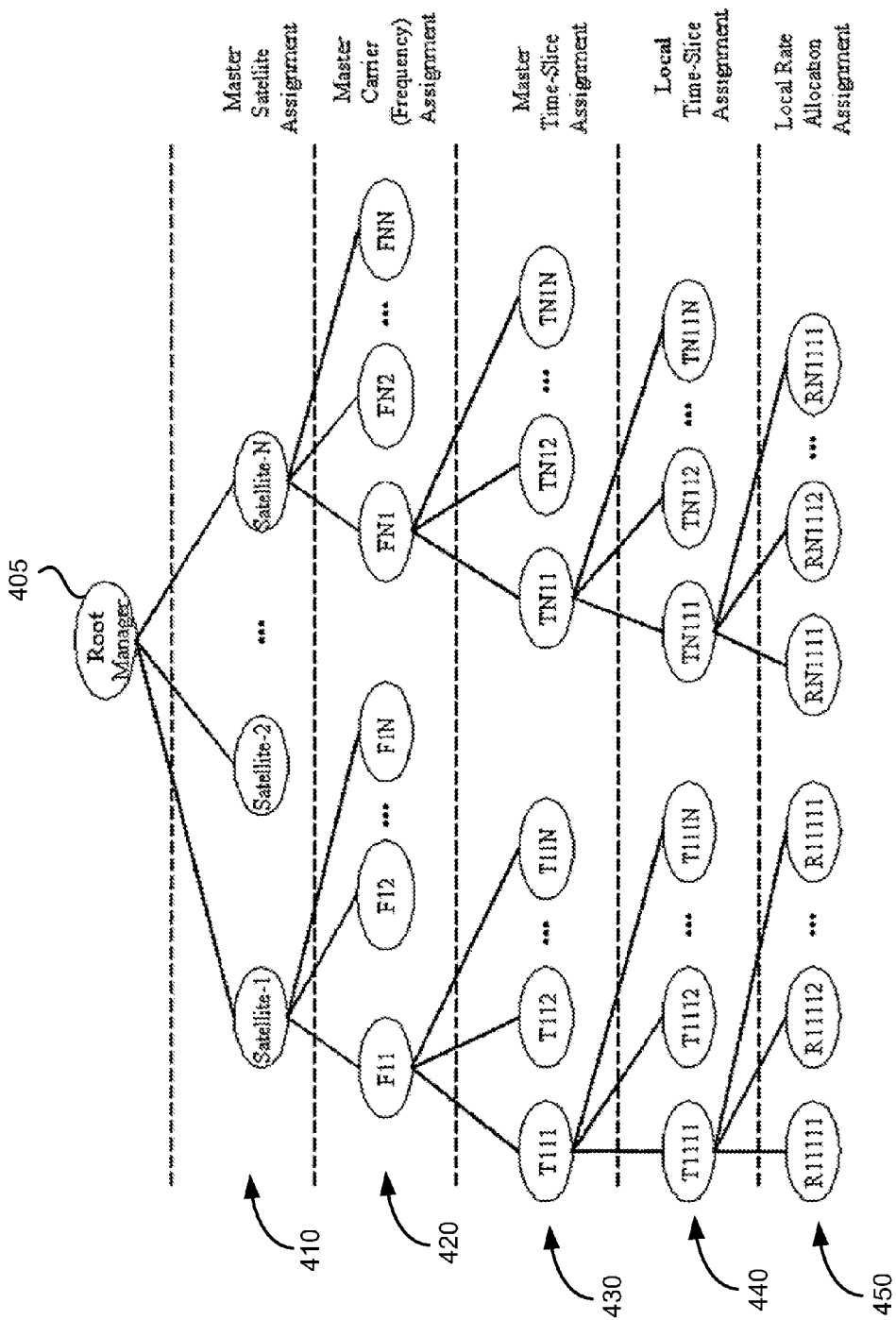
FIG. 4 is a logic diagram depicting one method for managing the space-channel, rate-time, and bandwidth hierarchy of various files to be multicast according to the present invention.
Figure 5:
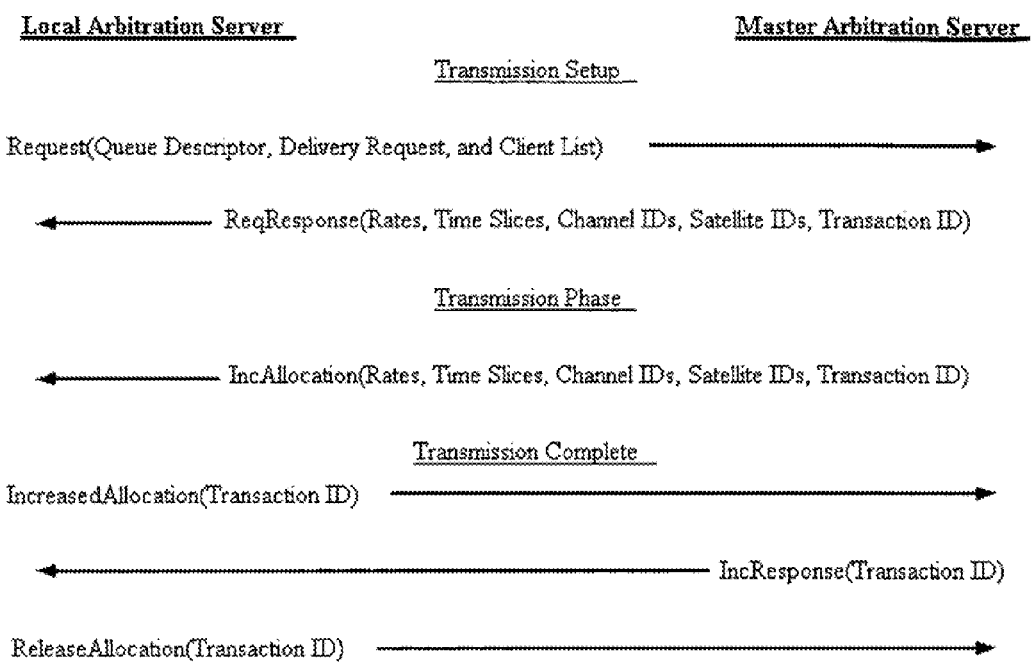
FIG. 5 depicts one request-grant protocol for implementing aspects of the present invention.

Dynamic Satellite, Frequency, Bandwidth, and Time Slice Allocation (FIGS. 4 and 5)

FIG. 4 shows a logical overview of a method of this invention for dynamically allocating files satellites, channels, rates, and times for transmission over a satellite network. FIG. 4 depicts a distributed control hierarchy in which a master arbitration server manages the steps in areas 410, 420, and 430 and local arbitration servers manage the steps in areas 440 and 450. Root manager 405, which is a core component of the master arbitration server, receives multiple requests for multicast file distribution from one or more local arbitration servers and, based on the client list for each request, satellites are allocated and within each satellite a specific channel or carrier frequency is allocated.

The master arbitration server, which allocates all resources, employs an appropriate priority scheme when responding to multiple requests for system resources, allowing finite resources to be shared. A preferred embodiment of a priority scheme is a first-come-first-serve resource allocation assignment. The master arbitration server may also use other priority schemes, such as, for example, basing the resource allocation assignment on the type of content in the multicast distribution request. For example, in media multicast distribution there may exist news media, advertisement media, promotional media, and programming media. With these types of media content, an exemplary priority scheme could address multicast distribution resource assignments based on the order listed above, i.e., news media has the highest priority and programming media has the lowest priority. When two or more requests are made for the same media type, then a second level of priority assignment based on first-come-first-serve may be enacted. In general, the master arbitration server must implement an appropriate priority assignment method for allocating system resources.

Returning to FIG. 4, satellite resources are represented by Satellite-1 through Satellite-N, and channel allocations are represented by frequencies F11 through F1N for Satellite-1 and FN1 through FNN for Satellite-N. Further management and control by the master arbitration server subdivides each channel into time slices, labeled T111 through T11N for the first channel on Satellite-1, T221 through T22N for the second channel on Satellite-2, and TN31 through TN3N for the third channel on Satellite-N, and so on (the "T" for time, the first number representing the satellite, the second number representing the channel, and the third number representing the time slice). The time slice assignment by the master arbitration server effects the priority scheme employed by the master arbitration server because the time slice assignment dictates when a local arbitration server may access an associated satellite resource. The master arbitration server may maintain a database describing the capacity on each channel available to the network.

The local arbitration servers receive satellite, channel, and time slice information from the master arbitration server, as well as initial bandwidth availability. The local arbitration servers use one or more satellite resources with associated channel and time slice allotments to distribute their respective multicast files to various receivers or clients as designated under control of the master arbitration server. Therefore, after satellite, channel, and time slice allotments, each local arbitration server assigns its multicast file distribution jobs a rate and may further subdivide each multicast file distribution job to different time slices beyond that initially assigned by the master arbitration server.

The notation assigned to allocated resources throughout the hierarchy shown in FIG. 4 follows the format that the first number references the satellite resource, the second number references the channel resource, the third number references the master time slice resource, the fourth number references the local time slice resource, and the fifth number references the assigned rate. Following the logic of the aforementioned notation, one can label all assigned rates based on their respective local time slices, allocated local time slices are labeled based on their respective master time slices, allocated master time slices are labeled based on their respective channels, and allocated channels are labeled based on their respective satellites. The management and control hierarchy shown in FIG. 4 uses this notation.

As an illustrative example of this invention using the network topology shown in FIG. 1 and the management and control hierarchy shown in FIG. 4, suppose that the master arbitration server assigns a thirty second time slice on channel-5 of Satellite-1, a thirty second time slice on channel-2 of Satellite-2, and a ten second time slice on channel-8 of Satellite-3. These assignments are based a first client list that includes clients from the client pools of Satellite-1 and Satellite-2, and a second client list that includes clients from the client pool of Satellite-3 respectively. In this example, the requests do not share satellite resources, and therefore priority assignments in the assigned time slices granted are trivial. Furthermore, suppose that Local Arbitration Server-1 initiated the request for multicast file distribution jobs with the first client list that includes clients from Client Pool-1 and Client Pool-2, and Local Arbitration Server-2 initiated the request for multicast file distribution jobs with the second client list that includes clients from Client Pool-3. Note that Satellite-1, Satellite-2, and Satellite-3 service Client Pool-1, Client Pool-2, and Client Pool-3, respectively.

At the next level of hierarchical control, the two local arbitration servers communicate with the master arbitration server and the required uplink sites associated with each satellite via the master control network. Access to an associated uplink is provided by a local arbitration server through the master control network. Furthermore, as indicated in FIG. 1, Local Arbitration Server-1 can directly access Satellite-1, however Local Arbitration Server-1 must route through the master control network and Local Arbitration Server-2 to access Satellite-2. Likewise, in order for Local Arbitration Server-2 to access Satellite-3 it must route its multicast file distribution through that master control network and Local Arbitration Server-3.

Given the illustrative example, it can be seen that after network resource allotments by the master arbitration server, Local Arbitration Server-1 uses the two thirty second time slices on channel-5 of Satellite-1 and channel-2 of Satellite-2 to send its multicast file distribution into Client Pool-1 and Client Pool-2 to reach the desired clients associated with the first client list. Thereafter or simultaneously, Local Arbitration Server-2 uses the ten second time slice on channel-8 of Satellite-3 to send its multicast file distribution job to Client Pool-3 where clients from the second client list reside.

In this example, the initial satellite, channel, and time slice allotments produced by the master arbitration server are based on requests from Local Arbitration Server-1 and Local Arbitration Server-2. The master arbitration server and/or the local arbitration servers can maintain a client pool database that designates which satellite resource services a particular set of receivers. The added spatial dimension provides the master arbitration server (and/or local arbitration server) with the ability to construct a set of receivers slated for a multicast file distribution from any arbitrary set of receivers available in the entire space of receivers (i.e., any arbitrary subset of a union of clients). For example, one can construct a multicast file distribution for any subset of the union of Client Pool-1, Client Pool-2, and Client Pool-3 in the illustrative example given above. This feature is novel to this invention and not disclosed in International Application Serial No. PCT/US00/10394. It should be understood that this invention does not restrict each client pool to separate domains serviced by separate satellites. In fact, certain exemplary embodiments of this invention may include some client pools that overlap (i.e., one or more clients can receive a transmission from one or more satellites).

Another feature of certain embodiments of this invention is the use of open time slices for system level management. For example, suppose there are three satellites in a network. Typically, there are time slices where only one or two of the satellites are used because not all multicast file distribution requests from the local arbitration servers require all satellite resources simultaneously. When time slice assignments are open, the master arbitration server may use these time slices for system level management multicast distribution to those client pools associated with the satellite(s) that has an open time slice. Examples of system level multicast distributions are system diagnostics requests or software updates to clients.

The existence of open or unused time slices across multiple satellites is not unique. However, managing open time slices under control of the master arbitration server permits the aggregation and use of such time slices according to certain methods and systems of this invention. This optimizes available multiple satellite resources across a diverse satellite distribution network. Aggregating multiple satellite resources for either system level distribution functions or for handling additional multicast distribution requests from local arbitration servers is novel to this invention and not disclosed in International Application Serial No. PCT/US00/10394.

Multicast file distribution is based on files subdivided into packets, and, therefore for each frequency or channel assignment on a satellite, there is rate and time multiplexing of packets that comprise the files earmarked for multicast file distribution. Whereas each local arbitration server may maintain a template for the satellite resource directly connected to it, the master arbitration server contains the overall resource usage picture. It is the overall system resource picture maintained by the master arbitration server that permits a new management and control level in the hierarchical network structure of certain embodiments of this invention.

FIG. 5 depicts a particular implementation of a request/grant protocol by which the local arbitration servers inform the master arbitration server of their need for new allocations. As seen in FIG. 5, in the Transmission Setup phase, the client that desires to send the job first sends a Request. In this instance, the client may be the local arbitration server, which has received a request for file transmission and priority information associated therewith. The request from local to master arbitration server provides a Queue Descriptor detailing priority information on the job, as well as a Delivery Request indicating completion time. The master arbitration server, which knows of the demands on the overall network, receives multiple Requests from multiple clients. It analyzes, prioritizes, and schedules the requests based on network resources, performance, and request priority data. It then forwards to each of the local arbitration servers a Request Response with the initial bandwidth (rate), time slice, channel (frequency), and satellite(s) required to reach the designated clients. A transaction ID for tracking purposes is also typically included.

Next, the transmission is scheduled and made by the local arbitration server and associated equipment. It may be that during or after the transmission the master arbitration server may recognize that the local arbitration server needs more capacity to complete its particular job. For example, the master arbitration server may have sent the local arbitration server only enough network transport capacity to complete part of the job in question, noted that deficiency and looked for additional system resources to allow transmission of the remainder of the file. Or, the master arbitration server may have received information concerning resource performance in the network (see FIG. 6) that caused it to reassess whether the released resources are sufficient. Additional system resources may be identified through unassigned time slices on the same of other satellites and hence the master arbitration server may be able to increase assigned resources in such cases. In either instance, the master arbitration server automatically sends an Incremental Allocation to the local arbitration server authorizing it additional bandwidth (e.g., rate) or time on the same or a different channel. Likewise, the master arbitration server may also adapt satellite resources as network conditions change. Conversely, the local arbitration server also can ask the master via an Incremental Request Allocation for additional satellite, bandwidth, time, channel capacity, etc., based on the demands and performance of the local resources at its disposal. Again, a unique transaction ID will be exchanged as part of these request/grant protocols, as well as appropriate job information such as file size remaining for transport, etc.

Using these techniques provides much greater flexibility for file transport. For instance, instead of requiring the local resources to be tied up while trying to complete a file transmission a set number of times, during which other files or pieces thereof cannot be sent over the network resource, this system allows the local arbitration servers intelligently to adapt to network conditions. In that manner, the local arbitration servers can decide to send a portion of the packetized file and schedule the remainder for later or decide to switch to another job altogether. This flexibility makes greater use of local resources since the local arbitration servers can ensure that any "gaps" in capacity are filled with pieces of jobs. Meanwhile, the master arbitration server still maintains control over the overall use of network resources and is able to build a picture of network usage and capacity based on the requests for reallocations generated by the local arbitration servers.

Figure 6:
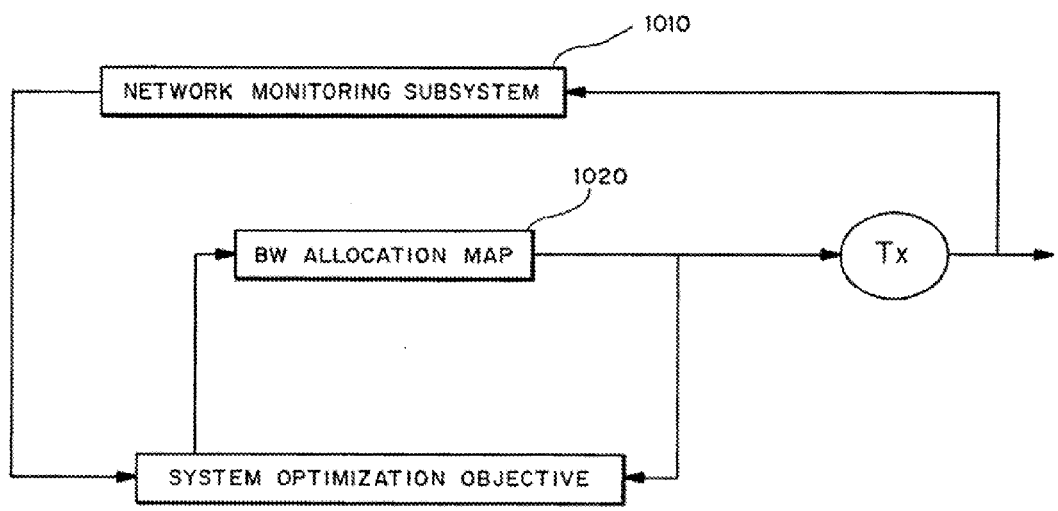
FIG. 6 is a logic diagram depicting the adaptation mechanism by which the methods and systems of the present invention adapt to varying network conditions in order more efficiently to distribute files.

Adaptive Satellite, Channel, Bandwidth, and Time Slice Allocation (FIG. 6)

FIG. 6 details another aspect of this invention. In any communications network, it is important to monitor the performance of various network resources, such as switches, routers, links, and the like. This invention also adapts to changes in network conditions whereby the monitoring information alerts the master arbitration server to the network conditions changes. By way of example, FIG. 6 schematically shows a simplified feedback loop whereby the scheduler, e.g., the master arbitration server, receives information from a network monitoring subsystem 1010, such as Solaris Openview or the like, that provides a traffic data feed concerning network conditions. That information is compared with the system optimization objectives, such as quality of service, use of capacity, etc. Together those parameters are taken into account by the master arbitration server as it sets its initial schedule or bandwidth allocation map 1020. Of course, each local arbitration server may also receive a data feed describing general network conditions or the performance and capacity of the communications equipment associated with that local arbitration server if desired.

Time Division Multiplexing Operation

Another mode of operation of the master arbitration server and Signaling System Servers of the present invention allows a Time Division Multiplex (TDM) mode of operation, giving each uplink station a periodic fixed time slice on a round robin basis. The duration of the time slice may depend in each case on, among other things, the capabilities of the uplink station to begin, conduct, and end its transmission, but could be measured in milliseconds or microseconds. Each uplink station has an absolute time reference (such as GPS) which allows its exact synchronization with other uplink stations. The transit time from each uplink station to a satellite in use is fixed by the physical location of the uplink station relative to the satellite's orbit. It is therefore possible for the master arbitration server to tell each uplink station when to begin and end its transmissions such that the transmissions from all of the uplink stations in the TDM group are concatenated as closely as possible upon their arrival at the satellite.

The authorizing message sent from the master arbitration server to each uplink station for TDM operation includes the starting time and ending time as usual, and also includes the exact time slice duration and period (the time from one time slice for this uplink station until the next). All local calculations of transmit intervals are absolutely deterministic, so that all uplink stations in the group remain in absolute synchronism throughout the period of the transmission without further interaction from the master arbitration server (although update messages, as mentioned above, are allowed).

The advantage of this mode of operation is that it allows a TDM group of almost any size to share a satellite channel for real-time audio or video conferencing or exchange of data, with a single set of uplink/receive equipment. A frequency division multiplexing approach (with each uplink station allocated its own bandwidth) requires separate equipment to receive and transmit to each participant at each location.

New System Protocol

This section describes an embodiment of an architecture that supports out-of-band signaling and control for transponder sharing. Using a single controller per channel on a transponder, uplink stations can communicate with the controller to negotiate for transponder capacity. Using TCP/IP as the signaling mechanism allows support of dialup connection as well. This is useful to anyone using a mobile uplink. The controller and the uplink stations may signal each other using the following protocol: Note: (parenthesis indicates state of parameters).

TABLE I

Basic Communication

| master arbitration server | Uplink |
|---|---|
| Idle | Service Request (requested parameters) |
| Service Authorized (granted parameters) | (Uplink In Use) |
| Heartbeat | Heartbeat response |
| . . . | Uplink finished (time expired) |
| (Satellite Resource free) | |

TABLE II

Transponder Busy

| master arbitration server | Uplink |
|---|---|
| (In use, no satellite resources available) | Service Request (requested parameters) |
| Transponder Busy (next avail . . . ) (Job in Queue) (Transponder free) | Queue Request (parameters) |
| Service Authorized (granted parameters) | (Uplink in use) |
| Heartbeat | Heartbeat response |
| . . . | Uplink finished (time expired) |
| (Satellite Resource free) | |

TABLE III

Signaling Channel Broken

| master arbitration server | Uplink |
|---|---|
| (Transponder in use) | (Uplink in use) |
| Heartbeat | Heartbeat response |
| . | . |
| . | . |
| . | . |
| Heartbeat | (no heartbeat, no response) |
| (Timeout) | (Timeout) |
| (Satellite Resource free) | (Uplink free) |

TABLE IV

Additional Signals

| master arbitration server | Uplink |
|---|---|
| Service interrupted (Satellite Resource free) | Uplink stopped (Stop transmission, Uplink free) |
| Status response | Status request |
| Status request | Status response |

TABLE V

Update from Uplink

| master arbitration server | Uplink |
|---|---|
| (Satellite resource in use) | Update request (new parameters) |
| Changes Authorized (new parameters) | Authorization updated |

TABLE VI

Update from Master Arbitration Server

| Master arbitration server | Uplink |
|---|---|
| Update request (new parameters) | Acknowledge receipt Notify Multicast group (new parameters) via satellite and Internet Receive acknowledgment from each member of group Make requested change |
| Update authorization Adjust satellite resource parameters | Acknowledge change accomplished |

TABLE VII

Other Control Via Web Console User Interface

| Master arbitration server | Uplink |
|---|---|
| Schedule Event | |
| Status | |
| Maintenance | |
| Logs | |
| IP Data | IP Data (over signaling channel) |

Using IP communication over satellite in one direction requires an IP gateway at the uplink station. Communication can be to any computer system with a DVB satellite card and a modem for creating a return path, although skilled persons will recognize many other implementations (the important thing is that there be some intelligence and a communication pipe for return messages). Either point to point or point to multi-point (multicast) communication can be used. For multicast implementation, the service provider may utilize Pathfire's multicast service or implement one of the methods suggested by the IETF to minimize retransmission.

In addition to the signaling protocol, adding an API on top of TCP/IP may provide TCP/IP applications, running at the uplink station, the option selectively to choose which data goes over the Internet or over the high speed satellite network. For example, the API may include an "h_write" (high speed write) routine that uses the IP over satellite if the transponder is freed. Other routines may include methods for query status of the satellite link. The API includes interfaces to the signaling protocol for requesting the usage of the transponder. The addition of this API allows IP applications to request for high speed data transfer and then start the data transfer possibly over the signaling channel until the capacity on the transponder is available. Details of the API are also available in Pathfire's Shared Transponder Technical Specifications document. Other considerations include:

Signaling dropped and reconnected

Extend period of transponder usage which could allow for the signaling channel to be disconnected during extended one-way data transfer.

Quality of Service request and signaling control

Managing of multiple carriers on a transponder.

There are several standard controls, on the modulator, the frequency upconverter, and the high power amplifier, which can be used to control the output of the transmit link. Each makes it possible to bring the transmit link to a state of readiness to transmit data within milliseconds. The appropriate choice of controls is the one that minimizes the latency from the authorized time to begin transmission and the presence of the carrier at the satellite.

In addition to the potential requirement for physical switching, there is a requirement for synchronization bits at the start of each transmission. A pattern of alternating 1's and 0's similar to the start of an Ethernet data packet (10101010) is required for some period of time to allow the receiver hardware to lock to a new transmitter on the network. As suggested in the introduction, a synchronization clock between transmitters is also required. This helps eliminate too lengthy a signal lock delay each time a change of control for the network is introduced.

Out of band signaling over the Internet allows bidirectional half duplex communications (the Internet is used as the control link for the high speed path). As a result, the protocol needs to be expanded with SS7 or equivalent protocol for high speed communications. SS7 or the equivalent should be available.

Illustrative Applications of the Present Invention

There are a number of potential applications of certain exemplary embodiments of the present invention that may be applied whenever there is a need to share a single satellite transponder or a number of satellite links among a network of uplinking earth stations, as well as when there is a need to share multiple satellites and associated transponders among a network of uplinking earth stations.

Application 1—Scheduled Transmission Through a Single Satellite Resource

In this application, a single uplinking earth station provides transmission services for a number of independent sources through a single satellite resource. The uplinking earth station is the only site that has access to the satellite resource, but there is contention among the sources coupled to the uplinking station for access time to the satellite. In this application, the control system can be used to prioritize and schedule access to the satellite.

In this example, the sources provide digitized video data and a video server at the uplinking location stores the data. The system includes a front-end application allowing a user to view, browse, and select files for transmission.

Once a file has been selected for transmission, the multicast server requests a transmission time for that file from a master arbitration server. In this example, the multicast and master arbitration servers may be one and the same since there is only one uplinking station. The master arbitration server prioritizes communications across the satellite data link.

The multicast server uses the Internet (or another suitable communications pathway) for communications with the receive stations or "clients." After it schedules a transmission with the master arbitration server, the multicast server contacts the client sites through an open multicast group address. The open group is contacted and the members of the smaller transmission group are instructed to begin "listening" to a satellite resource for the transmission. Once switched to the new closed group address, each client in the newly formed "closed group" is instructed to register with the multicast server that initiated the session. The server's IP address for this response is passed during the registration process. This response occurs over the Internet (or some other communications path for return data) and that client (or receive site) can now begin to receive the multicast data being distributed in that particular closed session.

The output of the multicast server is fed to an IP gateway. Most manufacturers of DVB transmission cards provide an IP gateway to encapsulate the network traffic within the MPEG2 transport data format before it reaches the satellite transmission modulator. The modulator uses a digital modulation technique to modulate the data. The resulting signal is then upconverted and amplified for transmission through the satellite to the clients.

Application 2—Access to a Single Transponder by Multiple Uplinking Earth Stations In this application multiple uplinking earth stations require access through a single satellite resource. The uplinking earth stations contend for access time to the satellite resource. The control system can be used to manage access to the satellite on a non-interfering basis among a network of independent transmitters.

In this example multiple uplinking sites are transmitting analog video broadcasts to a centralized location using an "occasional use" transponder. The control system has reserved a block of time for the uplinking sites to transmit video back to a central location. The master arbitration server schedules access to the transponder by multiple sites for short periods of time within this block of time.

Each uplinking earth station is outfitted with a multicast server, which provides the access control at the earth station. The multicast servers may access the Internet (or another communications pathway) for communications with the master arbitration server. In addition, the uplinking earth station site may have satellite modem equipment connected to the multicast server and satellite earth station transmission equipment. The master arbitration server schedules access for any individual multicast server placed at any uplinking earth station. The functionality of the local arbitration server described above may reside on the same platform deploying the multicast server.

The master arbitration server sends a message back to the requesting multicast server/local arbitration server containing its transmission window. The master arbitration server authorizes the actual transmission over the satellite by sending an authorization message for the designated satellite resource to the multicast server/local arbitration server that is scheduled to transmit. No transmission may begin over the resource until an authorizing message is received. The master arbitration server uses authorizing messages as the methodology to ensure that only one uplinking earth station is accessing the satellite resource at any given moment.

The master arbitration server sends an authorization message, after which the multicast server/local arbitration server manages the transmission of the data through the satellite transponder. The output of the multicast server/local arbitration server is then fed to the uplinking earth stations modulation equipment and then it is upconverted and amplified for transmission through the satellite transponder. The transmissions are received by the central location and stored for further processing.

Application 3—Access to Multiple Resources on a Single Satellite by Multiple Uplinking Sites In this application, multiple uplinking earth stations require access through multiple satellite resources on a single satellite. The uplinking earth stations contend for access time to the individual satellite resources. The control system can be used to support a variety of analog or digital transmission formats, but only one transmission format is used in any specific application. For instance, the control system may manage multiple analog video transmissions through multiple transponders or multiple digital transmissions through a single or multiple transponders.

In this example, multiple uplinking sites are transmitting digitized video broadcasts to a centralized location using one of several Frequency Division Multiplexed (FDM) satellite channels resident on a single satellite transponder. The channels are available on a full time basis. The control system randomly schedules access to the satellite channels by multiple sites for short periods of time.

Each uplinking earth station is outfitted with a multicast server, which provides the access control at the earth station. The multicast servers have access to the Internet (or another communications pathway) for communications with the master arbitration server. In addition, the uplinking earth station sites would have satellite modem equipment connected to the multicast server and satellite earth station transmission equipment. The master arbitration server schedules access for any individual multicast server placed at any uplinking earth station. In this example, the multicast server may also implement the functionality of the local arbitration server, particularly the ability to overlay new transfer rate or time slices onto a particular transmission job.

The master arbitration server sends a message back to the requesting multicast server containing its transmission window on one of the available satellite channels. The master arbitration server authorizes the actual transmission over the satellite by sending the multicast server that is scheduled to transmit an authorizing message for the designated satellite resource. The multicast server needs to tune its satellite modem to the satellite channel to which it has been assigned for the duration of the transmission. (An update message may cause a subsequent reallocation). The uplink station must continue to transmit a carrier even if it has exhausted its data until its authorization expires. If significant time remains, it may send an update message to the master arbitration server asking for an earlier expiration. No multicast server is authorized to begin transmitting data over the resource unless it has received an authorization message. The control system uses authorization messages as the methodology to ensure that only one uplinking earth station is accessing the satellite resource at any given moment. A multicast server must cease carrier transmission at the exact time specified on its current authorization message.

After it has received an authorizing message from the master arbitration server, the multicast server manages the transmission of the data through the satellite transponder. The output of the multicast server is then fed to the uplinking earth station's modulation equipment that has been tuned to operate through its assigned satellite resource. The signal is then upconverted and amplified for transmission through the satellite transponder. The transmissions are received by the central location and stored for further processing.

Application 4: Remote Satellite Truck Transmission

In this application, a remote video truck contains a signaling system server and multicast server with an Internet link (probably wireless, e.g. cellular). Many events covered are of short duration with an indeterminate start time, and a real time feed is not required. Instead of wasting satellite bandwidth waiting for the event to begin, the truck can capture the event (either on tape, for an analog transponder, or directly digitized to the multicast server for a digital transponder), then request an authorization. When it receives the authorizing message, it transmits the segment. At the expiration of the authorization, it powers down the carrier, an "all clear" indication is given to the operator, and the truck may be moved.

Application 5: Virtual Teleport

Several uplink stations managed by the same master arbitration server for a specific satellite may have facilities to reach satellites not available to other members of the group. For example, an east coast uplink station may be part of the same group as a west coast uplink station looking at a satellite with continental US coverage. The east coast uplink station may also have access to a European satellite, and the west coast uplink station may have access to an Asian satellite. If master arbitration servers control resources on all satellites, a virtual worldwide teleport may be established for scheduling resources between Europe and Asia, or any other two points.

Application 6: Real Time TDM Based Telecommunication, Including Video Conferencing Using the real-time Time Division Multiplexing strategy outlined above, it is possible to use a master arbitration server to assemble groups of managed clients for teleconferences. Existing videoconferencing equipment may be used. Only a small additional delay over and above a single satellite delay (probably on the order of fifty milliseconds for five interactive participants) is incurred. Any number of additional sites may participate in a receive only mode with the appropriate signaling system server.

Application 7: Access to Multiple Satellite Resources by Multiple Uplinking Sites In this application, multiple uplink sites require access to multiple satellite resources on multiple satellites. In this example, each uplink site has direct access to its respective satellite and resources therein. Also, the control system is used to facilitate resource management across multiple satellites and multiple uplink sites. This application includes multicast distribution from a plurality of digital media content providers who desire to distribute their content to a diverse and time changing set of clients.

In this application, each digital media content provider has access to one or more multicast servers for submitting content for distribution via a multi-satellite network, such as the network shown in FIG. 1. Each satellite is capable of transmitting signals to a pool of clients for receiving multicast distributions, such as that shown in FIG. 7. A satellite's ability to transmit signals to a client is defined by the transponder or channel used and a client being aligned to the satellite's orbital parameters and tuned to the channel used for transmission. Each multicast server provides a user interface that facilitates media content submission from a media content provider who has submission access to that multicast server.

Figure 7:
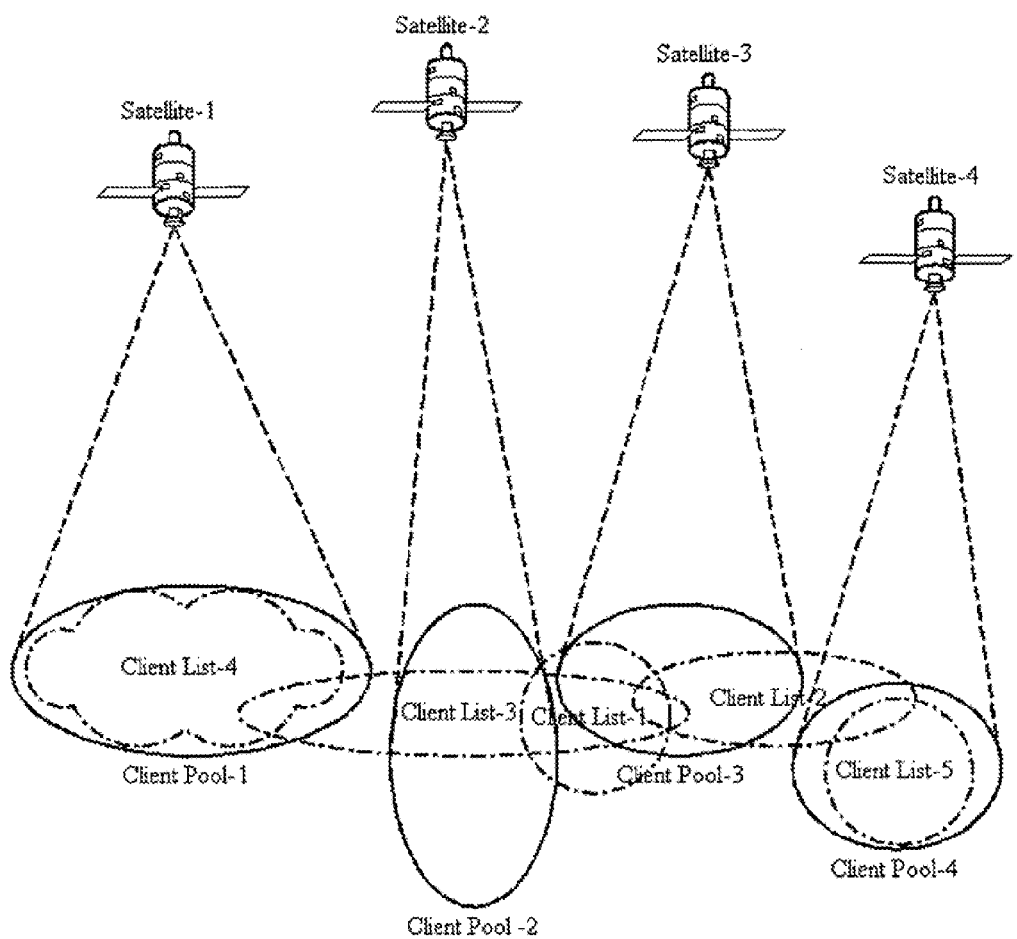
FIG. 7 is an illustrative application according to one embodiment of the present invention.

Using FIG. 7 as a reference, each multicast distribution may be targeted to one or more client pools. Each digital media content provider initiates a multicast distribution by submitting digital media content to one multicast server along with a client list that spans several client pools (such as, for example, Client List-3 shown in FIG. 7, which includes client in Client Pools 1–3). There is no restriction on content submission to several multicast servers simultaneously, and thus the control system manages system resources such that all distribution requests are serviced.

Upon media content submission to a multicast server, the associated local arbitration server requests resources from the master arbitration server based on the client list. The local arbitration server typically includes a priority setting with its request. Several parameters may effect the priority setting by the local arbitration server, including, but not limited to: (a) a priority setting based on input from the digital media content provider, and (b) an assessment of local resources known by the local arbitration server if those resources are necessary for the multicast distribution request made by the digital content provider. Ultimately, the master arbitration server establishes the priority level granted to the local arbitration server based on system level resources that are directly accessible by the local arbitration server and those that are not directly accessible by the local arbitration server. Therefore, a request and a request response, according to the protocol illustrated in FIG. 5 for example, are performed.

The master arbitration server responds with rate, time slice, channel assignment(s), satellite assignment(s), and a transaction identifier. The local arbitration server is now capable of initiating a multicast distribution through its associated multicast server based on the response from the master arbitration server. The rate information in the master arbitration response is multi-tiered, containing rates associated with channels that are in turn associated with satellites. This permits the multicast server that initiates a multicast distribution to control how it sends data to the various uplink sites necessary for the multicast distribution based on the client list. The multicast server may use its local uplink equipment as well as other uplink equipment according to the client list. Access to remote uplink equipment necessary for the multicast distribution is facilitated through the master control network and respective local arbitration server as shown in FIG. 1.

As the master arbitration server responds to multiple requests from local arbitration servers for access to multiple satellite resources, space division multiple access (SDMA) is employed in assigning multiple satellite resources, frequency division multiple access (FDMA) is employed in assigning channel resources, and time division multiple access (TDMA) is employed in assigning time slices, all per multiple multicast distribution requests. Rate assignments by the master arbitration server in conjunction with the satellite, channel, and time slice compose a four-dimensional control methodology novel to this invention.

Application 8: Content Distribution Network Utilizing Content from Multiple Providers This application includes a content distribution network system that utilizes content from multiple content providers. Each distribution job is slated for a different set of clients and may overlap one or more satellites based on how each client is set up to receive transmissions from each satellite. As shown in FIG. 7, a client list may include clients from a single client pool or more than one client pool. A client pool is defined by a group of clients that is set up to receive transmissions from a particular satellite. Each client list shown in FIG. 7, one through five, represents a distribution job. As shown in FIG. 7, there are four client pools, Client Pool-1, Client Pool-2, Client Pool-3, and Client Pool-4, serviced by Satellite-1, Satellite-2, Satellite-3, and Satellite-4, respectively.

In this application, the client pools may represent television stations that use advertising content from multiple advertisers. Because television stations sell airtime to a myriad of advertisers, both the source of advertising content and the use of advertising content are quite dynamic and vary over time. Additionally, this same application may be useful to send a broadcast message to clients where the client list includes all four client pools. Certain embodiments of this invention efficiently handle a diverse distribution overlay, as shown in FIG. 7, while maximizing network resources.

The foregoing description of the exemplary embodiments of the invention is presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. For example, the exemplary embodiments described utilize a multicast distribution network including satellites, satellite uplink equipment, and satellite receiver equipment, and alternative embodiments according to systems and methods of the present invention include any multicast distribution network with a master arbitration server, local arbitration servers, channel assignable wireline or wireless transmission equipment, and back channel networking via wireline or wireless access.

What is claimed is:

1. A method for dynamically allocating network transport resources in a diverse satellite communications network including a plurality of satellites and a plurality of uplink stations, the method comprising:

allocating a satellite from the plurality of satellites for a file transmission:

allocating a channel of the satellite, a bandwidth, and a time slice for the file transmission;

providing information concerning the satellite, channel, bandwidth, and time slice allocations to a plurality of geographically distributed controllers, each of which are coupled to one of the plurality of uplink stations;

using the controllers to adjust the allocated bandwidth, time slice, or both in order to optimize file transmission over the network; and contacting recipients of the file transmission in order to confirm receipt thereof.

2. The method of claim 1, further comprising contacting a group of recipients of the file to be transmitted over the network to inform the recipients of a transmission time.

3. The method of claim 2, further comprising sending an authorizing message before any file transmission over an uplink station.

4. A method for dynamically allocating network transport resources in a diverse satellite communications network including a plurality of satellites and a plurality of uplink stations, the method comprising:

allocating a satellite from the plurality of satellites for a file transmission;

allocating a channel of the satellite, a bandwidth, and a time slice for the file transmission;

providing information concerning the satellite, channel, bandwidth, and time slice allocations to a plurality of geographically distributed controllers, each of which are coupled to one of the plurality of uplink stations; and using the controllers to adjust the allocated bandwidth, time slice, or both in order to optimize file transmission over the network;

wherein allocating a satellite from the plurality of satellites comprises receiving a request from one of the plurality of geographically distributed controllers to transmit a file to a client list and determining which of the plurality of satellites serves clients on the client list.

5. The method of claim 4, further comprising allocating more than one satellite for the file transmission when the client list includes clients served by more than one of the plurality of satellites.

6. The method of claim 4, wherein each satellite of the plurality of satellites serves a client pool.

7. The method of claim 6, wherein determining which of the plurality of satellites serves clients on the client list comprises determining a client pool to which each client on the client list belongs.

8. The method of claim 7, further comprising allocating a satellite from the plurality of satellites for each client pool represented.

9. A method for managing multicast file distribution over a diverse satellite communications network including a plurality of satellites and a plurality of uplink stations, the method comprising:

storing at a first server information concerning:
the capacity of each satellite, and
the client pool served by each satellite;

receiving at the first server requests for access to satellites within the network, wherein each request includes a client list and contains at least some information relevant to setting a priority to be assigned the request;

for each request, identifying the client pools to which the clients on the client list belong;

for each client pool identified, forwarding to a local server information assigning a selected request a priority, a satellite, a channel, a time slice, and a transfer rate for a particular request for file transmission; and causing the local server to either adopt the time slice and transfer rate or to assign the request a different transfer rate, one or more different time slices, or both.

10. The method of claim 9, further comprising contacting recipients of the file transmission in order to confirm receipt thereof.

11. The method of claim 10, further comprising contacting a group of recipients of the file to be transmitted over the network to inform the recipients of a transmission time.

12. The method of claim 11, further comprising sending an authorizing message before any file transmission over an uplink station.

13. The method of claim 9, further comprising receiving data at the local server describing the capacity or performance of communications equipment coupled to the local server.

14. The method of claim 9, wherein a priority is assigned to a request based on a first-come-first-serve basis.

15. The method of claim 9, wherein a priority is assigned to a request based on the type of media content to be distributed.

16. A system for allocating network transport resources in a diverse satellite communications network including a plurality of satellites and a plurality of uplink stations, the system comprising:

a master arbitration server that:
allocates a satellite from the plurality of satellites,
allocates a channel of the satellite, a time slice, and a transfer rate,
and provides information on these allocations to each of at least two local arbitration servers:

the at least two local arbitration servers, each communicating with a satellite of the plurality of satellites and adapted to:

dynamically evaluate each request for transmission to determine whether to overlay upon the allocations by the master arbitration server an adjusted allocation changing the time slice, the transfer rate, or both associated with each request; and communicate with the master arbitration server regarding any changes to the time slice, the transfer rate, or both.

17. The system of claim 16, wherein the master arbitration server allocates a satellite from the plurality of satellites upon receiving a request from one of the at least two local arbitration servers to transmit a file to a client list and determining which of the plurality of satellites serves clients on the client list.

18. The system of claim 16, wherein the master arbitration server stores information concerning the capacity of each satellite and the client pool served by each satellite.

19. The system of claim 18, wherein upon receipt of a request from one of the at least two local arbitration servers to transmit a file to a client list, the master arbitration server identifies the client pools to which the clients on the client lists belong and allocates a satellite for each client pool identified.

20. The system of claim 16, wherein the master arbitration server:

recognizes when an open time slice exists on any of the plurality of satellites, and uses the open time slice to distribute diagnostic requests or software upgrades to a client pool associated with the satellite on which the open time slice exists.

* * * * *